United States Patent
Li et al.

(10) Patent No.: US 7,656,936 B2
(45) Date of Patent: Feb. 2, 2010

(54) METHOD AND SYSTEM FOR INTERFERENCE REDUCTION IN A WIRELESS COMMUNICATION NETWORK USING A JOINT DETECTOR

(75) Inventors: Hang Li, Allen, TX (US); Weidong Yang, Richardson, TX (US); Guanghan Xu, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 1811 days.

(21) Appl. No.: 10/352,774

(22) Filed: Jan. 28, 2003

(65) Prior Publication Data

US 2004/0146024 A1 Jul. 29, 2004

(51) Int. Cl.
*H04B 1/00* (2006.01)
*H04B 1/10* (2006.01)
*H04B 7/02* (2006.01)
*H04L 1/02* (2006.01)

(52) U.S. Cl. ................ 375/148; 375/144; 375/267; 375/347; 375/348

(58) Field of Classification Search ............. 375/144, 375/147, 148, 267, 340, 346–350
See application file for complete search history.

(56) References Cited

U.S. PATENT DOCUMENTS

| | | | |
|---|---|---|---|
| 6,487,252 B1* | 11/2002 | Kleider et al. | 375/260 |
| 6,961,365 B2* | 11/2005 | Li et al. | 375/148 |
| 7,295,637 B2* | 11/2007 | Papathanasiou et al. | 375/347 |
| 7,327,800 B2* | 2/2008 | Oprea et al. | 375/267 |
| 2003/0054828 A1* | 3/2003 | Dent | 455/450 |
| 2004/0116122 A1* | 6/2004 | Zeira et al. | 455/445 |

* cited by examiner

*Primary Examiner*—David B Lugo

(57) ABSTRACT

A method and system for reducing interference in a wireless communication network is disclosed. The wireless communication network has at least one base station using an antenna array and one or more code channels to receive or transmit one or more communication signals from or to a plurality of terminals used by one or more users. A signal received by the antenna array carries one or more training sequences and a traffic signal in a frame. After estimating a spatial signature and joint channel response model per user based on the training sequences, one or more spatial weights are found based on the estimated spatial signature and joint channel response model to maximize a signal to noise ratio. A joint detection matrix is then formed based on the estimated spatial weights, the joint channel response model, and a user code channel assignment. After code correlating a traffic signal to obtain one or more user specific multi-antenna signals, a spatial combining is performed on one or more multi-antenna signals associated with each user to generate scalar symbol estimates. Thereafter, a joint detection is done based on the scalar symbol estimates using the joint detection matrix. Similar techniques can be used for downlink communications.

49 Claims, 5 Drawing Sheets

METHOD AND SYSTEM FOR INTERFERENCE REDUCTION IN A WIRELESS COMMUNICATION NETWORK USING A JOINT DETECTOR

BACKGROUND

Techniques described herein relate to a wireless communication system in general, and more particularly, to a method and system for detecting a desired signal and reducing types of interference such as multi-user inter-symbol-interference (MU-ISI), multi-code interference (MCI), or inter network interference (INI).

A wireless communication involves a cellular structure where a call control and management device such as a base station is placed at the center of a cell and communicate with a number of terminals such as handsets or other communication devices using a predetermined frequency band. As such, the wireless communication network can serve multiple users. For the purpose of discussion, the term "terminal" is used interchangeably with the term "user" as each one terminal must have at least one user.

As it is well known, when the base station transmits signals to the terminal, the communication is referred to as a downlink communication. Similarly, when the terminal transmits signals back to the base station, it is known as an uplink communication. During both the uplink and downlink communications, the receivers of base stations or terminals receive the combination of the signals of interest and interfering communication interference signals such as multi-user inter-symbol-interference (MU-ISI), multi-code interference (MCI) and inter network interference (INI).

To support high speed internet access and multimedia communications, CDMA is extended to function as both access and variable rate modulation scheme. In this case, multiple codes can be assigned to a single user in response to dynamic communication traffic. So each user may be characterized by multiple code signatures. As is well known, the capacity of a CDMA system is largely limited by the multiple code interference (MCI) due to non-orthogonality among user signature waveforms as well as multi-user inter-symbol interference (MU-ISI) due to signature overlapping caused by channel dispersion. In synchronous communication systems, spreading codes are chosen to be mutually orthogonal. However, channel distortion, physical multipath or imperfect timing, can destroy this ideal property and introduce signature dispersion which causes the MCI and MU-ISI. The MU-ISI can be removed by inserting guard chips between symbols which causes low spectrum efficiency. The MCI and MU-ISI can also be mitigated by method of equalization which is effective only in the single user case. In addition to aforementioned intracell interference, other communications in the vicinity of the cell wherein the desired communication is carried out generate interference. All such types of interference are collectively referred to as the inter-network interference (INI). High INI also limits the system capacity.

In summary, the interference issue most likely arises in the following scenarios: (1) when air links suffer dispersive multipath with delay spread larger than the inversion of signal bandwidth and/or when timing is not perfect, the ideal orthogonality among spreading codes is destroyed, and the MCI and MU-ISI occurred; (2) when any undesired communications in the neighborhood of the cell generate the INI; (3) when non-orthogonal spreading codes are used by design to increase system utilization and throughput.

Smart antennas and joint detection are two powerful techniques proposed to suppress the above described types of interference in the space and time domain respectively. Smart antennas system employs antenna array at the base station to provide beamforming gain and/or diversity gain against interference and fading, thereby greatly enhancing signal-to-interference ratio at both the base station and mobile site. Further enhancement can be achieved in a multi-cell environment by explicitly making use of discrepancy in the spatial signatures between desired users and interfering sources. On the other hand, multiuser detection exploits the distinction in the temporal signature waveforms of multiple accessing users and applies either linear nulling and/or nonlinear soft/hard decision based cancellation to extract user information in a significantly more efficient way than conventional methods.

A big challenge of incorporating space-time processing into a base station is how to achieve both spatial and temporal diversity gain and capacity improvement in a multi-interference environment with reasonable computational complexity. In order to avail coherent detection, accurate and fast estimation of space-time channel response for multiple users is required in an interference prone and mobile environment.

What is needed is an improved method and system for offering all desired gains by employing multiple antennas and codes with reasonable complexity for detecting desired signals and canceling the various undesirable types of interference.

SUMMARY

The present disclosure provides a low complexity, high performance hybrid space-time joint detector amenable for real-time implementation. It integrates symbol-by-symbol linear MMSE projection, nonlinear soft/hard decision based cancellations and adaptive antenna array combining/nulling inside a unified multi-carrier wireless system with smart antenna. The low complexity is achieved by concatenation of reduction of spatial dimension and reduction of temporal dimension. The high performance is achieved by employing nonlinear interference cancellation along both code and symbol directions. For both uplink and downlink, different sources of interference induced by multipath propagation are mitigated by linear projection and interference cancellation. The undesired co-channel transmission such as inter-network interference is suppressed by beamforming or spatial nulling. Simultaneous multi-user channel identification is employed to generate user specific spatial signatures, joint detection order and joint detection matrices.

DESCRIPTION

Figure 1:
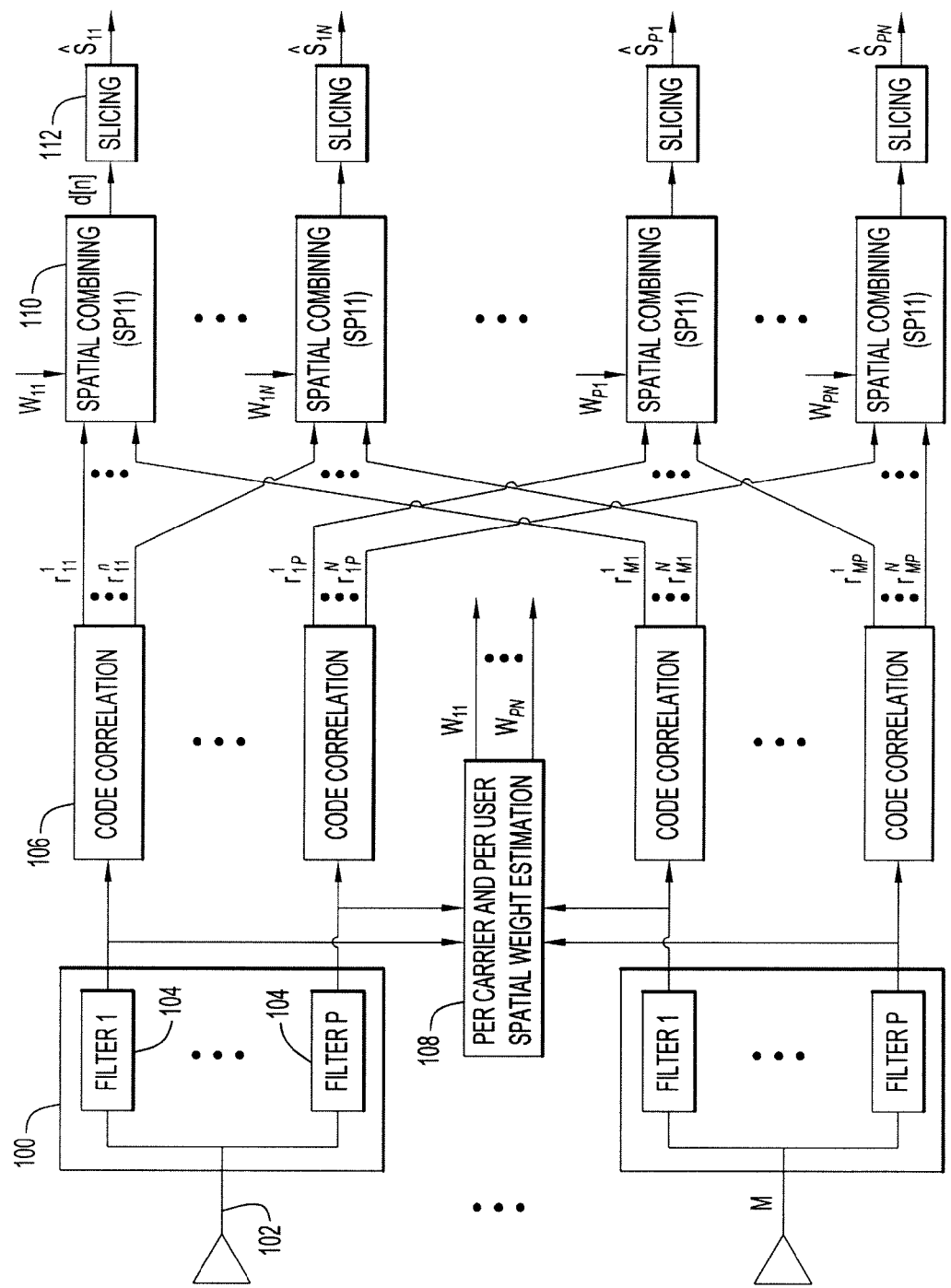
FIG. 1 shows a prior art multi-carrier space-time uplink detector employing smart antennas, a sub-carrier filter bank, code correlation at each antenna and spatial combining for each user.

The present disclosure uses, as an example, a synchronous code division multiple access (CDMA) system employing smart antenna at the base-station, which is subjected to multipath induced MCI, MU-ISI, and IN!. It is understood that other wireless communication systems suffering from these types of interference can use the same technique to improve their qualities.

Generally speaking, a multichannel transceiver array, or simply, an antenna array, at the base station comprises a plurality of antennas and a plurality of transceivers. The array is adapted for receiving combinations of multichannel uplink signals from the terminals and transmitting multichannel downlink signals towards the terminals. The antenna array is adapted for receiving the combinations of multichannel uplink signals from the terminals during a first time frame and is adapted for transmitting the multichannel downlink signals towards the terminals during a second time frame. The antenna array or the base station may have processors for performing baseband operations such as spatial parameter estimation, uplink and downlink beamforming and CDMA modulation and demodulation, etc. In some examples, one or more baseband processors may be used which includes one or more digital signal processors (DSPs) and memory devices. Different tasks may be realized using dedicated DSPs or by task-sharing. It is noted that the baseband processing may be implemented in various other manners, such as using one or more general purpose processors, one or more programmed microcontrollers, discrete logic, or a combination thereof.

Some of the processors may be referred to specifically as spatial processors. The functions of the spatial processor include estimating the spatial signatures, determining uplink power and timing offset of the terminals, and calculating the uplink and downlink beamforming matrices or vectors. In the present disclosure, the term "matrices" is intended to include both matrices and vectors, and the terms vectors and matrices may be used interchangeably. The spatial signature estimates comprise the transfer function or transfer characteristics between a respective terminal and the antenna array. There may be demodulators in the base station that constructively combine signals from each terminal and recover the uplink messages using uplink beamforming matrices and other information provided by the spatial processor.

In the base station, there are components for downlink communications. Downlink beamforming matrices may be calculated based on previous spatial signature estimates provided by the spatial processor to a modulator. The modulator modulates all downlink messages and generates mixed multichannel downlink signals to be transmitted by the antenna array. Modulation may involve code modulation of each signal after downlink beamforming.

For the demodulator, despreaders are used to despread uplink signals for each terminal using a code sequence provided by the code generator. The outputs of the despreaders are symbol sequences for different terminals. For each terminal, an uplink beamformer is coupled to the despreader that provides a symbol sequence for this terminal. The uplink beamformer obtains enhanced signals by combining the corresponding symbol sequence using its associated uplink beamforming matrix. The beamforming outputs are then passed along to detectors where message data from the terminals are detected.

For the purpose of illustration, it is assumed that the number of active users in each sub-carrier is $N_u$, the number of antennas at the base station is M, the number of antennas at each user is one, the spreading factor is N and the maximum channel order is L. It is also understood that each sub-carrier may use multiple code channels. For both the uplink and downlink, the data sequence sent for the $i^{th}$ (i=1, . . . , $N_u$) user may be a quadrature amplitude modulated (QAM) symbol sequence, denoted by $s_i[n]$. It is assumed that the $i^{th}$ user occupies $N_c^i$ code channels and is assigned a $N \times N_c^i$ code matrix $C_i = [c_1, \ldots, c_{N_c^i}]$. $C_i$ can be real or complex, each $s_i[n]$ is then a $N_c^i \times 1$ vector. Without loss of generality, it is assumed that $N_c^i = 1$ and $N_u = N$ for the subsequent analysis. If the user does occupy multiple channels, the code channel assignment can be represented as multiple users each using a different code channel. It is further assumed that the base station possesses user transport profile such as a set of code channels occupied and modulation scheme of each code channel. The profile may change since the data rate of each user varies during a data session.

From this point on, it is assumed that the channel response of all users is available for both downlink and uplink communications. The channel response can be estimated through a first part of the incoming signal frame. The estimation is carried out employing either training sequence aided approach or non-data aided approach. The channel response matrix seen by the all M antennas for $i^{th}$ user is denoted as $$H^i = \begin{bmatrix} h_{10}^i & h_{11}^i & \cdots & h_{1L}^i \\ h_{20}^i & h_{21}^i & \cdots & h_{2L}^i \\ \vdots & \vdots & \ddots & \vdots \\ h_{M0}^i & h_{M1}^i & \cdots & h_{ML}^i \end{bmatrix} \quad (1)$$

Assuming the frame length in terms of symbol is Q, then after analog-to-digital conversion and sampling the received (NQ+L)×1 uplink discrete-time traffic signal vector for $m^{th}$ base-station antenna is:

$$r_m = \sum_{i=1}^{N} G_m^i s_i + v_m + z_m \quad (2)$$

where $v_m$ is NQ×1 receiver thermal noise vector and $z_m$ is NQ×1 interference vector. $s_i = [s_i[0], \ldots, s_i[Q-1]]^T$ is the transmitted data sequence for the whole frame and $G_m^i$ is (NQ+L−$p_i$)×NQ composite channel response matrix for the channel between the $i^{th}$ antenna and the $i^{th}$ user given by, $$G_m^i = \begin{bmatrix} H_m^{ip_i} C_i & 0 & \cdots & 0 \\ 0 & H_m^{i0} C_i & \ddots & \vdots \\ \vdots & \ddots & \ddots & 0 \\ 0 & \cdots & 0 & H_m^{i0} C_i \end{bmatrix} \quad (3)$$

where $H_m^{ip_i}$ is the (N+L−$p_i$)×N convolution matrix for the channel between the $m^{th}$ antenna and the $i^{th}$ user with data truncation point at $p_i$, i.e., $$H_m^{ip_i} = \begin{bmatrix} h_{mp_i}^i & \cdots & h_{m0}^i & 0 & \cdots & 0 \\ h_{m(p_i+1)}^i & h_{mp_i}^i & \cdots & h_{m0}^i & \ddots & \vdots \\ \vdots & h_{m(p_i+1)}^i & & \cdots & \ddots & 0 \\ h_{mL}^i & \vdots & & & \ddots & h_{m0}^i \\ 0 & h_{mL}^i & & & \ddots & \vdots \\ \vdots & & & & & h_{mp_i}^i \\ \vdots & & \ddots & \ddots & & h_{m(p_i+1)}^i \\ & & & & & \vdots \\ 0 & & \cdots & & 0 & h_{mL}^i \end{bmatrix} \quad (4)$$

FIG. 1 illustrates a multi-carrier space-time uplink detector 100 with functional blocks. The data received at the antenna 102 goes through a set of sub-carrier filters 104. The detector 100 then performs a set of code correlation in block 106 on a symbol-by-symbol basis to the received data and extracts one or more user specific multi-antenna signals on per sub-carrier basis. In one example, the received chip data is truncated from the $p_i^{th}$ chip according to symbol synchronization mechanism. The code correlation can be implemented with the Fast Hadamard Transform (FHT) to reduce computation complexity if a Walsh code is employed as the spreading code.

The output streams of the filters 104 are switched to a user and sub-carrier specific spatial combiner 108. Either non-data-aided scheme or training sequence aided scheme can be designed to estimate the user and sub-carrier specific spatial signatures and produce spatial weights, which in turn are applied to the incoming data after the code correlation to complete linear spatial combining in block 110. After that, the per user and per sub-carrier data are fed into a slicer 112 for detection. The above described conventional method provides a low complexity space-time approach. In essence, for each carrier, the data of a whole frame are segmented into Q consecutive blocks of length N chips and a space-time linear combiner is applied to each block of dimension M×N to complete the symbol detection. To be more specific, after the code correlation, the corresponding symbol level space-time data model can be represented as $$\hat{r}[n] = \sum_{i=1}^{N_u} \{\hat{H}_i[0]s_i[n] + \hat{H}_i[1]s_i[n-1] + \hat{H}_i[-1]s_i[n+1]\} + \hat{v}[n] + \hat{z}[n] \quad (5)$$

$\hat{H}_i[0]=[C_i^H T_0^i H_1^{i0} C_i, \ldots, C_i^H T_0^i H_1^{i0} C_i]^T$, $\hat{H}_i[1]=[C_i^H T_1^i H_1^{i0} C_i, \ldots, C_i^H T_1^i H_1^{i0} C_i]^T$ and $\hat{H}_i[-1]=[C_i^H T_{-1}^i H_1^{i0} C_i, \ldots, C_i^H T_0^i H_{-1}^{i0} C_i]^T$.

In the above expressions, $T_k^i$, k=−1, 0, 1, i=1, ..., $N_u$ are truncating matrices defined as follows $$T_0^i = [0_{N \times p_i} I_N 0_{N \times (L-p_i)}] \quad (6)$$

$$T_1^i = \begin{bmatrix} 0_{(L-p_i) \times (N+p_i)} I_{L-p_i} \\ 0_{(N+L-p_i) \times (N+L)} \end{bmatrix}$$

$$T_{-1}^i = \begin{bmatrix} 0_{(N-p_i) \times (N+L)} \\ I_{p_i} 0_{p_i \times (N+L-p_i)} \end{bmatrix}$$

Figure 2:
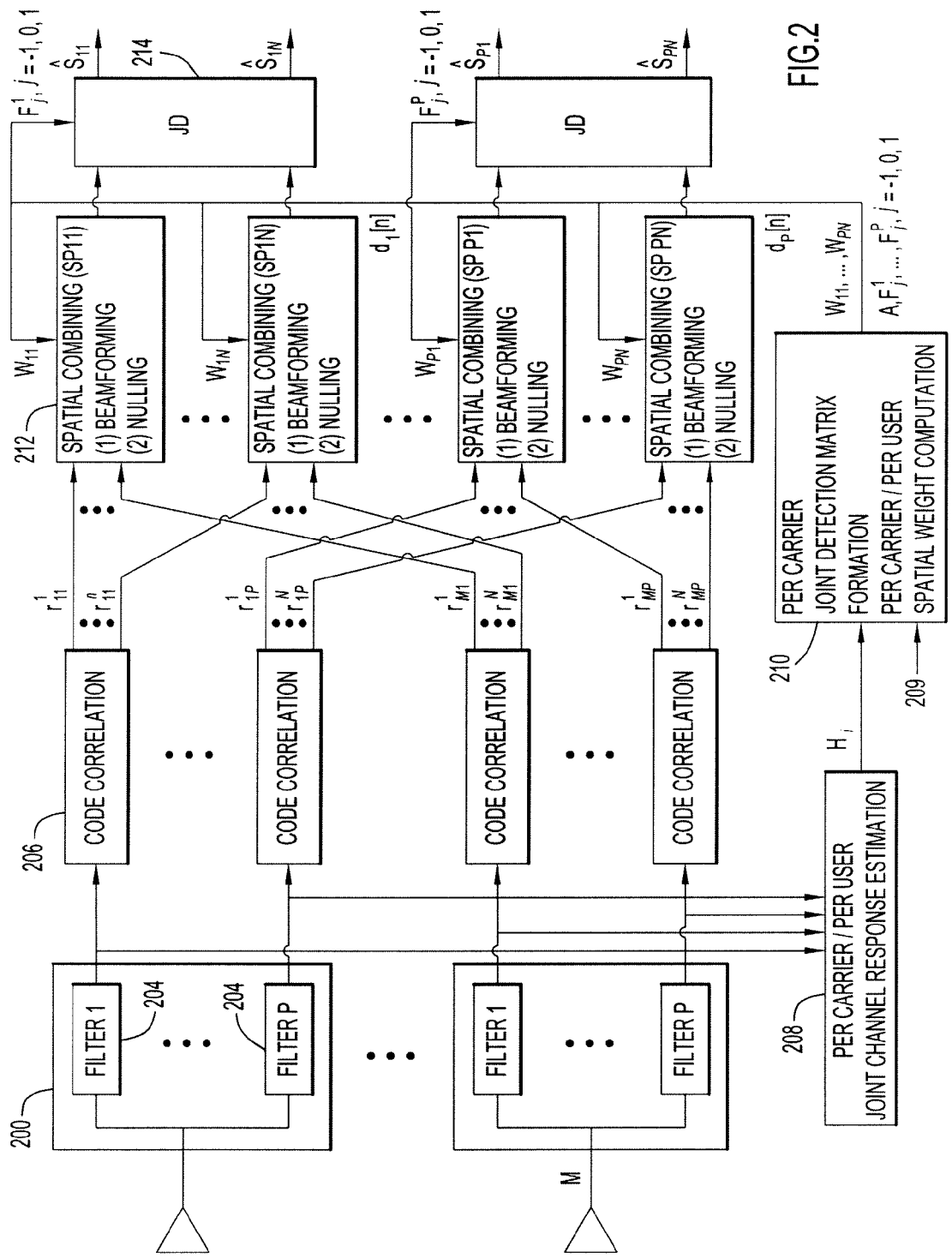
FIG. 2 illustrates an improved uplink space-time joint detector according to one example of the present disclosure.

In order to preserve low or reasonable complexity while maintaining the high performance, a symbol-by-symbol space-time MMSE joint detector with interference cancellation is disclosed. FIG. 2 illustrates an uplink space-time joint detector 200 according to the present disclosure. Although theoretically a training sequence is not necessary, for the purposes of illustration, a training sequence is preferred to be used at the beginning of a data frame, followed by the traffic data and interference data (including noises), for getting a better channel estimation and future joint detection performance. Similar to the detector 100 of FIG. 1 in its initial stage, filters 204 and code correlation block 206 performs similar tasks. It is understood that if there is no training sequence, a first part of the traffic signal will be used for spatial signature estimation and/or channel response estimation. When one or more training sequences are used, they may be followed by a traffic signal for each user and corresponding types of interference. The training sequence is sent to block 208, which performs per sub-carrier per terminal channel response model estimation to be fed in block 210, which does per sub-carrier joint detection matrix formation and per sub-carrier per terminal spatial weight computations. For the traffic signal, the code correlation block generates user specific multi-antenna signals. The interference (and noise) of the incoming signal 209 can also be sent to block 210. The products of the block 210, which are the spatial weights and joint detection matrices, are further fed into corresponding spatial combiners 212 and joint detectors 214. The spatial combiner can either perform nulling to maximize the signal-to-noise-plus-interference ratio or beamforming to maximize the signal-to-noise ratio. The spatial combiner thus generates one or more scalar symbol estimates. Using the scalar symbol estimates, the joint detector generates refined user specific symbol estimates.

The uplink channel estimation process applied to the first part of the incoming signal frame. It is designed to extract a channel response matrix of all users and all antennas. As will be discussed later, it is understood that the uplink channel estimation process can also be used to aid downlink transmission for time division duplex (TDD) mode. One embodiment of the channel estimation process employs one or more training sequence. The training sequence may be an orthogonal circulant sequence of length $N_t$, denoted by t[n], n=0, ..., $N_t$−1. The orthogonal property is expressed as $$\delta[(m)_{N_t}] = \sum_{i=0}^{N_t-1} t^H[i]t[(i-m)_{N_t}] \quad (7)$$

where $(\bullet)_{N_t}$ denotes the remainder of division by $N_t$. In a matrix form, the property also manifests as $$T^H T = I_{N_t} \quad (8)$$

where T is a $N_t \times N_t$ circulant matrix formed with t[n], i.e., $$T = \begin{bmatrix} t[0] & t[N_t-1] & \cdots & t[1] \\ t[1] & t[0] & \cdots & t[2] \\ \vdots & \vdots & \ddots & \vdots \\ t[N_t-1] & t[N_t-2] & \cdots & t[0] \end{bmatrix} \quad (9)$$

The training sequences are assigned in such a way that the $i^{th}$ user sends the $[(i-1)N_s+1]^{th}$ column of T preceded by its cyclic prefix of length L. $N_s$ may satisfy $N_t=N_s N$ and $N_s>L$. In one example, based on a finite impulse response (FIR) channel model, $h_m^i=[h_{m0}^i, \ldots, h_{mL}^i]$ would represent the channel response of the $i^{th}$ user at the $m^{th}$ antenna. Noting that $N_u=N$ in each sub-carrier of interest, and by properly truncating the data at the $m^{th}$ receiver, the received signal $r_m$ can be expressed by $$r_m = Th_m + v_m + z_m \quad (10)$$

where $v_m$ is thermal noise vector, $z_m$ is interference vector and $h_m$ is given by $$h_m = [[(h_m^1)^H 0_{1 \times (N_s-L-1)}], \ldots, [(h_m^N)^H 0_{1 \times (N_s-L-1)}]]^H \quad (11)$$

Assuming both $v_m$ and $z_m$ are Gaussian, the maximum likelihood (ML) estimation of $h_m$ is given by $$\hat{h}_m = T^H r_m \quad (12)$$

In one example, a fast joint channel estimation is achieved by choosing $N_t$ to be a power of 2. If the circulant matrix T can be further decomposed as $T=F^H \Phi F$, where F is a normalized Fast Fourier Transform (FFT) matrix and $\Phi$ is a diagonal matrix with non-zeros elements, which are complex numbers of unit amplitude, then equation (12) can be carried out employing FFT operations represented by $\hat{h}_m = F^H \Phi^H F r_m$. In the antenna array and the base station, the above operation may be carried out at each antenna as a part of chip data processing. In a later stage, a predetermined spatial combining process can be employed to remove interference term $z_m$. As also will be discussed later, for downlink communications, a similar operation is carried out only once since spatial processing is most likely done at the base station.

For illustration purposes, the following assumptions are made for both uplink and downlink to facilitate further analysis. First, all signals are synchronously received symbols and the network system is fully loaded. Second, the channel delay spread is smaller than one symbol period. Third, the channel coefficients remain constant over the whole frame and the carrier phase is compensated. The above assumptions localize the MU-ISI to only immediately adjacent symbols and the channel estimation obtained based on the training sequence at the beginning of the frame is able to be applied to the traffic data following the training sequence within the frame.

Figure 3:
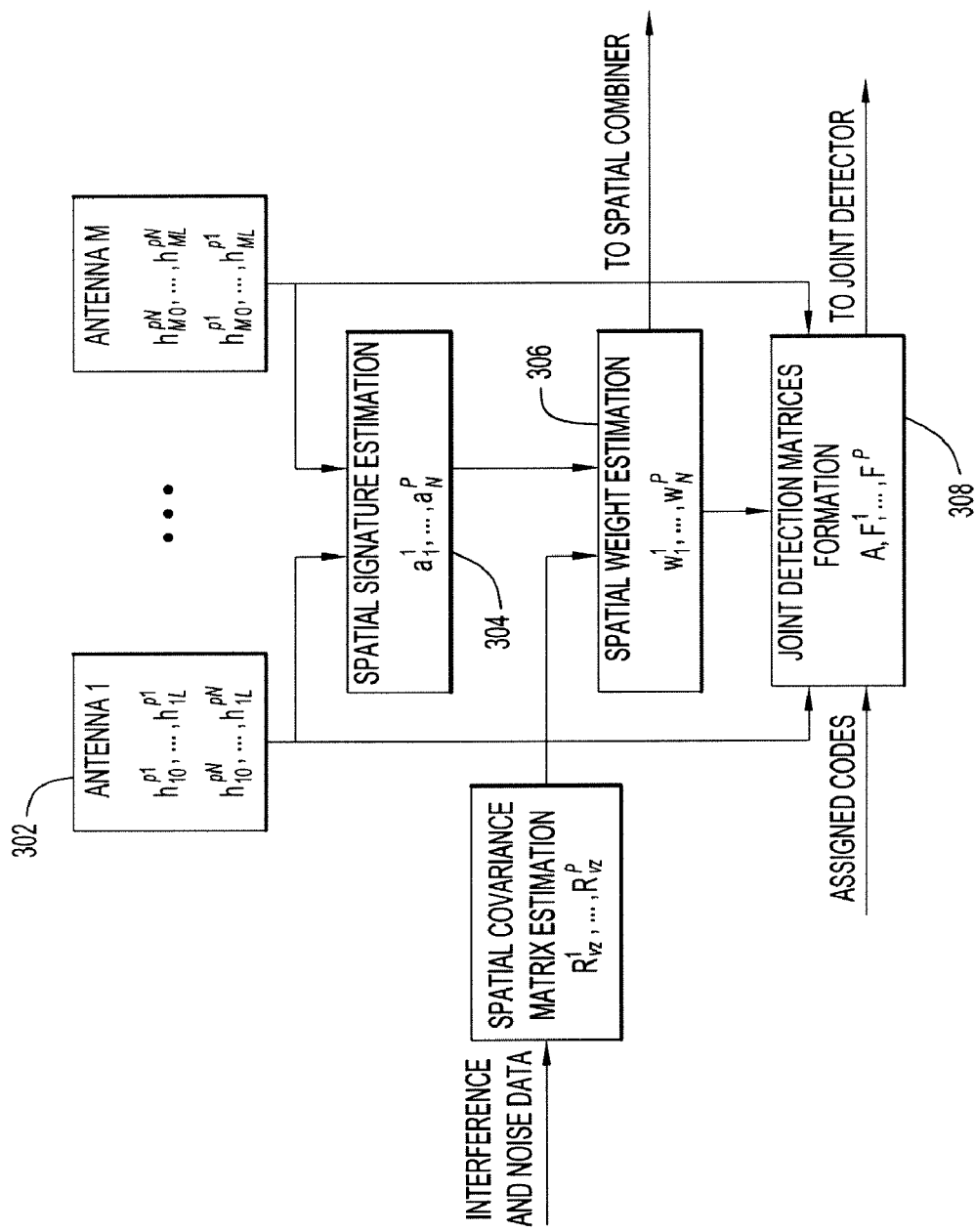
FIG. 3 illustrates detailed functional blocks for spatial weight estimation and joint detection matrix formation.

FIG. 3 illustrates the details of the functional block 210 of FIG. 2. Using the joint channel response from each antenna 302, the spatial signature estimation is done in the functional block 304, and the spatial weight computations are further completed in block 306 based on each terminal's spatial signature and covariance matrix of interference and noise for the sub-carrier of interest. Thereafter, the spatial weights, assigned codes, and the joint channel response are all fed into block 308 to calculate the channel matrix. More specifically, the spatial weight $w_i$ is determined based on the $i^{th}$ user's spatial signature $a_i$ and covariance matrix $R_{vz}$ of interference-plus-noise for the sub-carrier of interest. For the data aided approach (i.e., a training sequence is used), the spatial signature is defined as the direction along which maximum signal energy of all paths is delivered, i.e., $$a_i = \arg\max_a \{\|a^H H^i\|^2\} \tag{13}$$

It can be shown that given a channel response matrix $H^i$ for the $i^{th}$ user, the spatial signature satisfying above criterion is the left singular vector corresponding to the largest singular value of $H^i$. The following singular value decomposition relates to the spatial signature.

$$H^i = U \Sigma V^H, a_i = U(:,1) \tag{14}$$

Under the maximum ratio combining criterion, the uplink spatial weight is equal to the spatial signature, i.e., $w_i = a_i$. When applying the spatial weights in the spatial combiner, the complex conjugate of the spatial signature is used for maximizing the signal-to-noise ratio (SNR).

In an interference prone environment such as frequency reuse wireless networks, constrained minimum output energy (MOE) criterion leads to good performance and the spatial weight is referred to as the null steering weight since it tries to null out signals coming from all other directions except the desired direction, $$w_i = \arg\min_w \{\|w^H r\|^2\}, \text{ s.t. } w^H a_i = 1 \tag{15}$$

The solution of (16) is given by $$w_i = \frac{R_{vz}^{-1} a_i}{a_i^H R_{vz}^{-1} a_i} \tag{16}$$

Accordingly, the above weight maximizes the signal-to-noise-plus-interference ratio (SINR). Therefore, the weights of all $N_u$ users form a N×NM beamforming matrix $$W = [w_1 \otimes e_1, \ldots, w_{N_u} \otimes e_{N_u}] = [W_1, \ldots, W_{N_u}] \tag{17}$$

where $e_k$ is a N×1 vector with 1 on the $k^{th}$ element and 0 on others. $\otimes$ denotes kronecker product.

Referring back to FIG. 2, the N×1 multiuser data sequence obtained after the beamforming within the spatial combiner 212 can be expressed by $$d[n] = W^H \hat{r}[n] \tag{18}$$

and $d[n]$ is fed into a joint detector 214.

Using the model represented by equation (5), first in the spatial combiner, a spatial combining is performed as shown in (18), the resulting data model is given by $$d[n] = F_0 s[n] + F_0 s[n-1] + F_{-1} s[n+1] + v_F[n] + z_F[n] \tag{19}$$

where $s[n] = [s_1^T[n], \ldots, s_{N_u}^T[n]]^T$ and $$F_j = \begin{bmatrix} W_1 \hat{H}_1[j] & \cdots & W_1 \hat{H}_1[j] \\ \vdots & \ddots & \vdots \\ W_1 \hat{H}_1[j] & \cdots & W_1 \hat{H}_1[j] \end{bmatrix}, j = -1, 0, 1 \tag{20}$$

Figure 4:
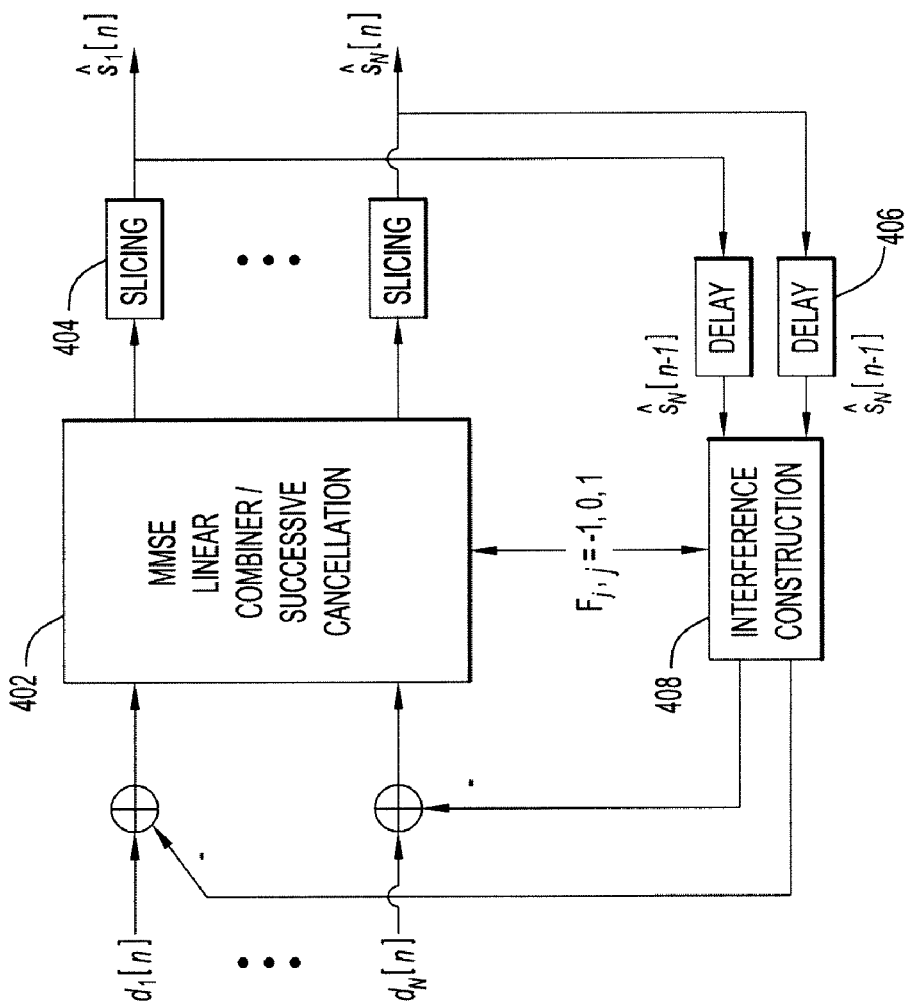
FIG. 4 illustrates a decision feedback joint detection mechanism usable by both the uplink and downlink joint detectors.

FIG. 4 illustrates a join detector 214 of FIG. 2 with hard decision based feedback for MU-ISI cancellation. After the outputs from the spatial combiner feed into a MMSE linear combiner or successive cancellation block 402, they further go into a set of slicers 404 to generate the symbols. The symbols are fed back, with delay (block 406, and help to construct interference in block 408. As such, the constructed past interference can be subtracted from the incoming data. The mathematics are further described below.

Since $F_0 s[n]$ carries the information for the data to be detected, $F_1 s[n-1]$ denotes the interference induced from previous symbols of all users, $F_{-1} s[n+1]$ denotes the interference induced from next symbols of all users. $v_F$ and $z_F$ are the thermal noise and interference after beamfoming respectively. If a nulling process is employed in an adaptive beamforming algorithm and the correlation between desired user and interference is below some threshold, the interference can be cancelled significantly without enhancing thermal noise. For symbol-by-symbol detection, the detection order is determined by relative total energy carried by $F_1$ and $F_{-1}$. Assuming $\|F_1\|^2 > \|F_{-1}\|^2$, then the previous symbol interference dominates and a better detection should go along with an increasing order of n and the detected data during the previous symbol period can be employed to cancel out interference contributed by previous symbols of all users.

A linear combiner matrix A is derived under the MMSE criterion in which interference from the next symbol period is treated as noise and the detection of previous symbol is assumed to be perfect, namely, $$A = \arg\min_{\overline{A}} \{E \|\overline{A}(d[n] - F_1 s[n-1]) - s[n]\|^2\} \quad (21)$$

The solution of (21) is given by $$A = F_0^H (F_0 F_0^H + R_{vz} + F_{-1} F_{-1}^H)^{-1} \quad (22)$$

Note from (22) that both A and the matrix to be inverted are of a dimension N×N, thus a huge amount of computation has been saved especially when a short length code is employed. For example, the traffic data processing requires only $O(MNQ+N^2Q)$ in contrast to $O(MN^2Q^2)$. The saving is very significant especially when Q is large. It is noted that both the linear combiner matrix A and the channel matrix $F_j$ can be collective referred to as the joint detection matrix or JD matrix, and they are both fed into the joint detector.

The basic symbol-by-symbol joint detection (JD) algorithm is given as follows assuming the first symbol does not suffer interference from previous symbol period, $$\hat{s}[1] = D\{Ad[1]\}$$

$$\hat{s}[n] = D\{A(d[n] - F_1 \hat{s}[n-1])\}, n=2, \ldots, Q \quad (23)$$

$D\{\bullet\}$ denotes slicing or hard decision performed on each component of a symbol vector based on respective modulation scheme. The above scheme accommodates adaptive carrier phase recovery to be integrated. In addition, combination of multiple modulation schemes can be employed for s[n], i.e., different user employs different modulation scheme depending on respective link quality and traffic intensity.

The aforementioned algorithm employs hard decision feedback to subtract interference from previous symbol vector and perform linear processing to null out MCI in the current symbol period. In case $F_1$ and $F_{-1}$ carry comparable energy, the performance can be further improved by integrating iterative forward-backward vector ISI subtraction and successive MCI cancellation. If a perfect power control is available, successive cancellation can cause asymmetric performance along codes and the error propagation can be harmful. However in the multipath scenario, even if all code energies are the same, code signatures may carry quite different energies with non-orthogonality among them. As a result, the channel matrix $F_0$ can have bad condition that enhances noise when the linear nulling is performed. Code ordered successive detection helps to overcome such bad condition of the channel matrix $F_0$ induced by those unfriendly channels.

In order to deal with both the past and future interference, a two-or-more-pass iterative forward-backward vector ISI subtraction method can be used in the joint detector. After the symbol vector s[n+1] is detected, s[n] is detected again by subtracting both $F_1 \hat{s}[n-1]$ and $F_{-1} \hat{s}[n+1]$. Thus interference from both the previous symbol and next symbol is mitigated and the improvement becomes bigger if more passes are integrated. More passes is feasible by allow increased complexity. The two-pass algorithm is demonstrated as follows:

$$\hat{s}^{(1)}[0] = 0; \hat{s}^{(0)}[1] = D\{Ad[1]\}$$

$$\hat{s}^{(0)}[2] = D\{A(d[2] - F_1 \hat{s}^{(0)}[1])\}$$

$$\hat{s}^{(1)}[1] = D\{A(d[1] - F_{-1} \hat{s}^{(0)}[2])\}$$

for n=3 to Q $$\hat{s}^{(0)}[n] = D\{A(d[n] - F_1 \hat{s}^{(0)}[n-1])\}$$

$$\hat{s}^{(1)}[n-1] = D\{A(d[n] - F_1 \hat{s}^{(1)}[n-2] - F_{-1} \hat{s}^{(0)}[n])\} \quad (24)$$

end

As an alternative to the MMSE linear combiner 402 in FIG. 4, and to overcome potential bad condition of $F_0$, a process called successive cancellation can be employed in detecting each symbol vector. In detecting each symbol vector, the joint detector detects one component symbol at a time and cancels out its contribution from the received signal vector before detecting the next component symbol in the same symbol vector. Suppose the ISI from both previous and next symbols has be perfectly cancelled out based on the forward-backward iterative ISI cancellation, the successive cancellation will generate the following sequences of data model $$d^{(i)}[n] = F_0^{(i)} s^{(i)}[n] + v_F[n] + z_F[n], i=0, \ldots, N-1 \quad (25)$$

where $s^{(0)}[n] = s[n]$ and $d^{(0)}[n] = d[n]$. At $i^{th}$ iteration, after a component symbol $s_{k(i)}[n]$ is detected where k(i) is the code index for the detection, the $k(i)^{th}$ component of $s^{(i-1)}[n]$ is removed to get the reduced signal vector $s^{(i)}[n]$. $F_0^{(i)}$ is the deflated matrix with respect to $F_0^{(i-1)}$ by removing the $k(i)^{th}$ column of $F_0^{(i)}$. The data model (25) is updated accordingly. The detection order is determined by performing linear MMSE detection on the undetected symbols according to the updated data model. The symbol with maximum signal-to-noise ratio will be detected first and its hard decision is utilized to cancel its contribution to the received signal to obtain updated $d^{(i)}[n]$. Instead of computing a single MMSE matrix A, a ordered linear nulling vector sequence is computed $a^{(i)}$, i=0, ..., N-1. Then linear nulling and nonlinear cancellation are applied to the received data alternatively and sequentially in an optimized order to detect symbols. Like the iterative forward-backward algorithm, the above described successive cancellation is an add-on algorithm which replaces the MMSE linear combination by a hybrid linear/nonlinear processing method. This additional part for the $n^{th}$ symbol interval is shown as follows $$d^{(0)}[n] = d[n]$$

for i=1 to N-1

$$\hat{s}_{k(i)}[n] = D\{(a^{(i)})^T d^{(i)}[n]\}$$

$$d^{(i)}[n] \; d^{(i-1)}[n] - F_0 e_{k(i)} \hat{s}_{k(i)}[n] \quad (26)$$

end

Again, the above detection procedure is modulation order independent. It is easily seen that the complexity of the above successive cancellation algorithm is comparable to its MMSE linear processing counterpart.

Figure 5:
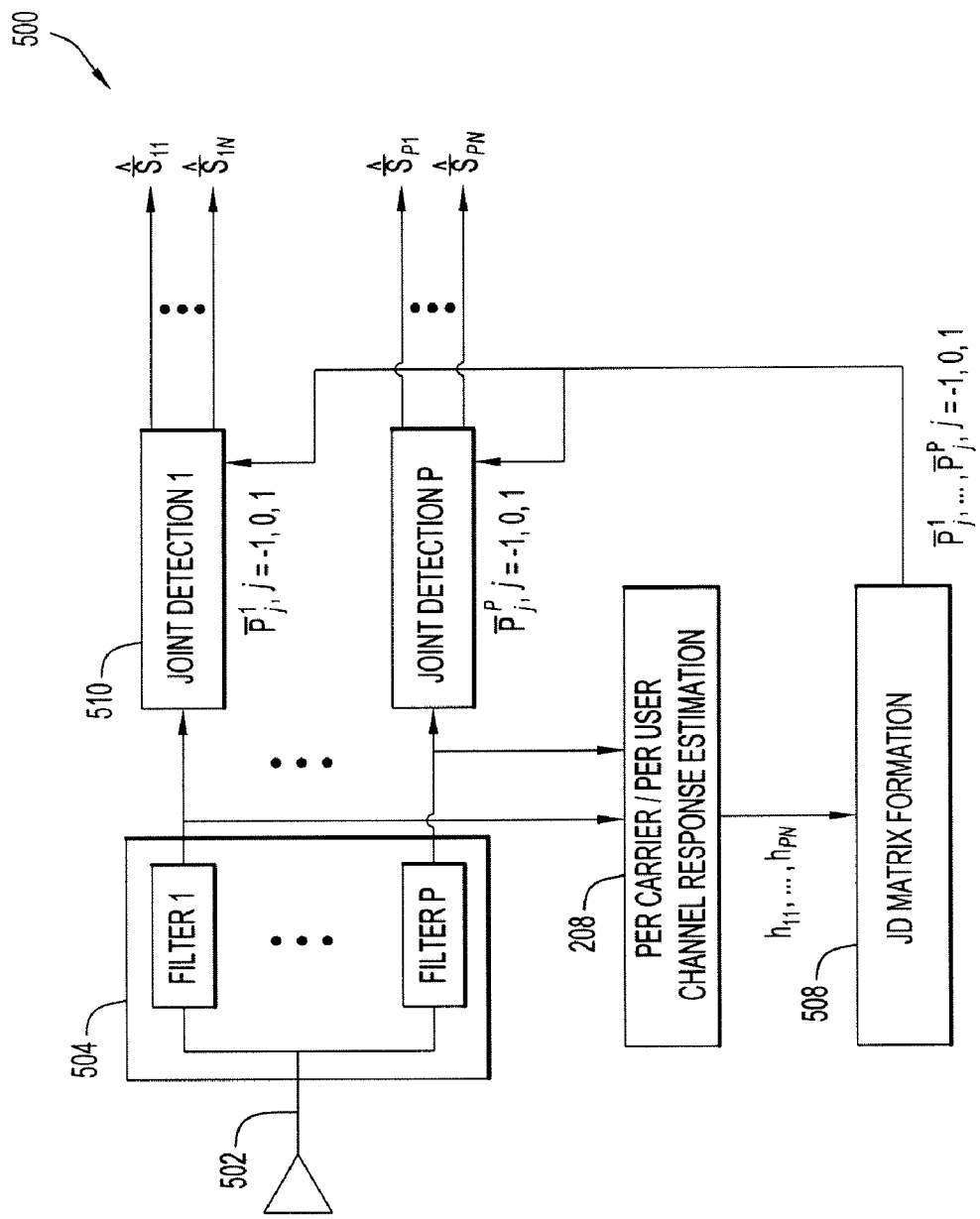
FIG. 5 illustrates an improved downlink detector according to the present disclosure.

FIG. 5 illustrates an improved downlink detector 500 according to the present disclosure. Received data 502 goes through the filters 504, and the training sequence goes to the channel estimation block 506, and further to the joint detection matrix formation block 508. The joint detection matrix is then fed back to the joint detection block 510 to help generating the desired symbols.

Differences between the downlink and uplink system should be noted as follows: (1) the beamforming is carried out at the transmission site and the downlink receiver sees effective channels in time domain only; (2) signals of all users are sent out synchronously and timing synchronization is conducted at the receiver; (3) the receiver may not have the entire profile such as modulation order, number of channels for all users in the same carrier. For any receiver, only profile information of itself is timely delivered to the receiver to save protocol overhead. However, energy of each code channel can be derived from downlink channel estimation and can be employed to determine the number of significant channels to be included in the joint detection algorithm. In addition, since downlink receiver does not know of the modulation order of channels other than those occupied by itself, hard decision cannot be used to perform decision feedback based joint detection or successive code channel cancellation. Instead, amplitude-limited soft decision (ALSD) is employed to perform aforementioned nonlinear processing. Amplitude limiting constrains the received symbols from other channels to the average symbol amplitude per channel irrespective of the true constellation and keeps the phase information unchanged. This operation reduces the noise contributing to the signal amplitude. It is understood that all two previous discussed joint detection algorithms can use the ALSD to perform detection.

To elaborate the downlink joint detection algorithm, the same channel notion is used for the downlink communication since the TDD uplink channel is the same as downlink channel assuming the frame is short in time. The receiver does not perform code despreading, but still perform channel estimation for all channels in the sub-carrier. The received data 502 is cut into Q overlapping segments r[n], n–1, . . . , Q. Each r[n] is a (N+L)×1 vector. The last L chips of r[n] are overlapped by the first L chips of r[n+1]. To be exact, the received signal for the $k^{th}$ user of the whole frame is given by $$r_k = \sum_{i=1}^{N_u} \left( \sum_{m=1}^{M} w_{im} J_m^k \right) s_i + v_k + z_k \tag{27}$$

where $w_{im}$ is the downlink spatial weight for the $m^{th}$ antenna and $J_m^k$ is the composite channel response matrix given by $$J_m^i = \begin{bmatrix} H_m^{i0} C_i & 0 & \cdots & 0 \\ 0 & H_m^{i0} C_i & \ddots & \vdots \\ \vdots & \ddots & \ddots & 0 \\ 0 & \cdots & 0 & H_m^{i0} C_i \end{bmatrix} \tag{28}$$

The downlink composite channel response matrix $J_m^k$ is different from uplink in the first diagonal block matrix due to different synchronization mechanism. After segmentation, the (N+L)×1 data vector is given by $$d_k[n] = P_0^k s[n] + P_1^k s[n-1] + P_{-1}^k s[n+1] + v_F[n] + z_F[n] \tag{29}$$

(29) is the same as the uplink model (5) except that the channel matrix formation is different in its truncating matrices which are given by $$T_0^i = [I_{N+L}] \tag{30}$$

$$T_0^i = \begin{bmatrix} 0_{L \times N} I_L \\ 0_{N \times (N+L)} \end{bmatrix}$$

$$T_{-1}^i = \begin{bmatrix} 0_{N \times (N+L)} \\ I_L 0_{L \times (N+L)} \end{bmatrix}$$

and $$P_j^k = \left[ \sum_{m=1}^{M} w_{1m} H_m^{k0} C_1, \ldots, \sum_{m=1}^{M} w_{N_u m} H_m^{k0} C_{N_u} \right], j = -1, 0, 1.$$

To detect data for the $k^{th}$ user, it needs to be known which of other code channels should be included into the joint detection along with code channels of the user, i.e., determine the order of the joint detection. The energies of other code channels relative to that of the $k^{th}$ user are utilized to make such decision. The channels concerned here are spatial combined channels given by $$H^i = \sum_{m=1}^{M} w_{im} H_m^{i0}, i = 1, \ldots, N_u.$$

and $\|H^i(:,1)\|^2$ gives the total energy of the $i^{th}$ user. The inclusion criterion is given by $$\frac{\|H^i\|^2}{\|H^k\|^2} \geq \delta, i \neq k \tag{31}$$

where δ is the prescribed threshold. Note however that the decision is made on a code channel basis instead of user basis since the receiver does not have the profile of other users in the same carrier. Code channel with small energy below the threshold will be omitted from the solution and be treated as noise. After the joint detection order is determined, a data model similar to (29) is obtained shown below.

$$\bar{d}_k[n] = \bar{P}_0^k \bar{s}[n] + \bar{P}_1^k \bar{s}[n-1] + \bar{P}_{-1}^k \bar{s}[n+1] + v_F[n] + \bar{z}_F[n] \tag{32}$$

The difference between (32) and (29) is that (1) the dimension of $\bar{s}[n]$ is $N_c^k + N_c^o$ where $N_c^o$ is the number of significant code channels of other users; (2) $\bar{P}_j^k$ contains a subset of columns of $P_j^k$ corresponding to the selected code channels; (3) $\bar{z}_F$ contains interference contributed from the code channels which are occupied by other users but are omitted based on above criterion. Accordingly, even through the downlink receiver only needs to detect data sent to itself, joint detection of all significant code channels is preferred since strong interference from undesired users' signals can occur due to high correlation in temporal signature and/or spatial signature and joint detection can mitigate those interference. Given the model represented by equation (32), all aforementioned three joint detection algorithms for uplink can be applied to downlink with the modification that hard decisions for $N_c^o$ components in $\bar{s}[n]$ due to other users' data are replaced by corresponding amplitude limited soft decisions. In addition, downlink channel response matrix estimation and joint detection matrix formation can apply the same scheme presented for uplink. The downlink channel response matrix estimation measures the composite channel from multiple transmission antennas to one receiver antenna considering the effect of spatial weights applied at the base station. Define $\tilde{D}\{\bullet\}$ as the hybrid operator performing both hard decision or/and amplitude limited soft decision on the decision vector $\bar{s}[n]$ generated by joint detection process and j as the index of the downlink user. When applied to the $i^{th}$ component of decision vector $\bar{s}[n]$, denoted as $\hat{\bar{s}}_i[n]$, $\tilde{D}\{\bullet\}$ operator can be expressed as follow $$\tilde{D}\{\hat{\bar{s}}_i[n]\} = \begin{cases} D\{\hat{\bar{s}}_i[n]\} & \text{if } i \in S_k \\ B_i \dfrac{\hat{\bar{s}}_i[n]}{|\hat{\bar{s}}_i[n]|} & \text{if } i \in S_j, j \neq k \end{cases} \tag{33}$$

where $B_i$ is the amplitude prescribed for $i^{th}$ code channel and $S_j$ is the index set of the code channel occupied by the $j^{th}$ user. Then (23), (24) and (26) become the corresponding downlink joint detection algorithms by replacing $D\{\bullet\}$ by $\hat{D}\{\bullet\}$.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A method comprising:
    receiving a user signal at a base station with a plurality of antennas configured to receive user signals from a plurality of terminals;
    estimating a spatial signature and channel response model for each user signal at one or more sub-carriers based on a first part of the user signal;
    finding one or more spatial weights based on the estimated spatial signature and channel response model;
    forming one or more joint detection matrices based on the estimated spatial weights, the channel response model, and user code channel assignment;
    code correlating the user signal to obtain one or more user specific multi-antenna signals;
    performing spatial combining, using the spatial weights, on the one or more user specific multi-antenna signals to generate one or more scalar symbol estimates; and
    performing joint detection based on the scalar symbol estimates using the one or more joint detection matrices to generate refined user specific symbol estimates.

2. The method of claim 1, further comprising assigning orthogonal user code channel assignments to the plurality of terminals receiving further comprises receiving synchronous transmissions from the plurality of terminals.

3. The method of claim 1, wherein the first part of the user signal is at least one orthogonal circulant training sequence.

4. The method of claim 3, wherein a length of the at least one orthogonal circulant training sequence is of a power of 2.

5. The method of claim 1, wherein estimating comprises applying a Fast Fourier Transform to the user signal.

6. The method of claim 1, wherein code correlating comprises applying a Fast Hadamard Transform to the user signal.

7. The method of claim 1, wherein performing joint detection further comprises performing joint detection based on the scalar symbol estimates with hard decision based feedback to reduce interference from a previous symbol vector.

8. The method of claim 1, wherein performing joint detection further comprises performing linear combining or a successive cancellation to reduce multi-code interference.

9. The method of claim 1, wherein performing joint detection further comprises performing an iterative forward-backward vector inter-symbol interference subtraction based on the scalar symbol estimates with hard decision based feedback to reduce interference from a previous and next symbol vector.

10. The method of claim 9, wherein performing the iterative forward-backward vector inter-symbol interference subtraction comprises performing at least two iterations.

11. The method of claim 1, wherein forming joint detection matrices further comprises deriving one or more channel matrices and a linear combiner matrix at each sub-carrier.

12. The method of claim 11, wherein deriving further comprises using a criteria in which interference from a next symbol period is treated as noise when the joint detection uses hard decision based feedback from a previous symbol in order to reduce inter-symbol interference.

13. The method of claim 1, wherein spatial combining further comprises beamforming to maximize a signal-to-noise ratio.

14. The method of claim 1, wherein spatial combining further comprises a nulling process to maximize a signal-to-noise-plus-interference ratio.

15. A method comprising:
    receiving a user signal at a terminal with at least one antenna configured to receive user signals comprising one or more sub-carriers from a base station;
    estimating a channel response model at each sub-carrier based on a first part of the user signal;
    forming at least one joint detection matrix based on the channel response model and user code channel assignment;
    dividing the user signal into at least first and second segments, wherein a predetermined number of last chips of the first segment overlap a same predetermined number of first chips in the second segment; and
    performing a joint detection on each overlapping segment using the joint detection matrix to reduce multi-user inter-symbol interference and multi-code interference.

16. The method of claim 15, wherein the first part of the user signal is at least one orthogonal circulant training sequence.

17. The method of claim 16, wherein a length of the at least one orthogonal circulant training sequence is of a power of 2.

18. The method of claim 15, wherein estimating is further based on downlink spatial weights provided by the base station.

19. The method of claim 15, wherein forming further comprises forming the joint detection matrix based on one or more other significant code channels.

20. The method of claim 19, further comprising determining energy levels of the one or more other significant code channels and determining which of the one or more other significant code channels to be used when performing joint detection based on the energy levels.

21. The method of claim 15, wherein performing further comprises applying feedback to the joint detection with amplitude limited soft decisions.

22. The method of claim 15, wherein performing further comprises performing linear combining or successive cancellation to reduce multi-code interference.

23. The method of claim 15 wherein the performing joint detection further comprises constructing past interference and subtracting the past interference from incoming data.

24. The method of claim 15, wherein forming the at least one joint detection matrix further comprises deriving one or more channel matrices.

25. The method of claim 15, further comprising deriving a linear combiner matrix at each sub-carrier.

26. An apparatus comprising:
    a plurality of antennas;
    a receiver coupled to the plurality of antennas configured to receive user signals from a plurality of terminals;

a processor coupled to the receiver configured to:
   estimate a spatial signature and channel response model for each user signal at one or more sub-carriers based on a first part of a user signal;
   determine one or more spatial weights based on the estimated spatial signature and channel response model;
   form one or more joint detection matrices based on the estimated spatial weights, the channel response model, and user code channel assignment;
   code correlate the user signal to obtain one or more user specific multi-antenna signals;
   spatially combine, using the spatial weights, on the one or more user specific multi-antenna signals to generate one or more scalar symbol estimates; and
   perform joint detection based on the scalar symbol estimates using the one or more joint detection matrices to generate refined user specific symbol estimates.

27. The apparatus of claim 26, wherein the processor is further configured to assign orthogonal user code channel assignments to the plurality of terminals and receive synchronous transmissions from the plurality of terminals.

28. The apparatus of claim 26, wherein the processor is configured to estimate the spatial signature based on the first part of the user signal that comprises at least one orthogonal circulant training sequence.

29. The apparatus of claim 28, wherein the processor is configured to estimate the spatial signature based on the at least one orthogonal circulant training sequence comprising a length that is a power of 2.

30. The apparatus of claim 26, wherein the processor is configured to estimate the spatial signature based on a Fast Fourier Transform.

31. The apparatus of claim 26, wherein the processor is configured to perform joint detection based on scalar symbol estimates with hard decision based feedback to reduce interference from a previous symbol vector.

32. The apparatus of claim 26, wherein the processor is configured to perform joint detection by performing linear combining or successive cancellation to reduce multi-code interference.

33. The apparatus of claim 26, wherein the processor is configured to perform joint detection by performing an iterative forward-backward vector inter-symbol interference subtraction based on the scalar symbol estimates with hard decision based feedback to reduce interference from a previous and next symbol vector.

34. The apparatus of claim 33, wherein the processor is configured to perform the iterative forward-backward vector inter-symbol interference subtraction for at least two iterations.

35. The apparatus of claim 26, wherein the processor is configured form one or more joint detection matrices by deriving one or more channel matrices and a linear combiner matrix at each sub-carrier.

36. The apparatus of claim 35, wherein the processor is configured to derive using a criteria in which interference from a next symbol period is treated as noise when the joint detection uses hard decision based feedback from a previous symbol in order to reduce inter-symbol interference.

37. The apparatus of claim 26, wherein the processor is configured to spatially combine using beamforming to maximize a signal-to-noise ratio.

38. The apparatus of claim 26, wherein the processor is configured to spatial combine using a nulling process to maximize a signal-to-noise-plus-interference ratio.

39. The apparatus of claim 26, wherein the processor is configured to code correlate using a Fast Hadamard Transform.

40. An apparatus comprising:
at least one antenna;
a receiver coupled to the at least one antenna configured to receive signals from a base station;
a processor coupled to the receiver configured to:
   estimate a channel response model at one or more sub-carriers based on a first part of the signal;
   form at least one joint detection matrix based on the channel response model and code assignment; and
   divide the signal into at least first and second segments, wherein a predetermined number of last chips of the first segment overlap a same predetermined number of first chips in the second segment;
   perform a joint detection on each segment using the joint detection matrix to reduce multi-user inter-symbol interference and multi-code interference.

41. The apparatus of claim 40, wherein the processor is configured to estimate based on the first part of the signal that comprises at least one orthogonal circulant training sequence.

42. The apparatus of claim 41, wherein the processor is configured to estimate based on the at least one orthogonal circulant training sequence comprising a length that is a power of 2.

43. The apparatus of claim 40, wherein the processor is configured to estimate using downlink spatial weights provided by the base station.

44. The apparatus of claim 40, wherein the processor is configured to form the at least one joint detection matrix based on one or more other significant code channels.

45. The apparatus of claim 44, wherein the processor is further configured to determine energy levels of the one or more other significant code channels and to determine which of the one or more other significant code channels to be used during joint detection based on the energy levels.

46. The apparatus of claim 40, wherein the processor is configured to perform joint detection by applying amplitude limited soft decision feedback.

47. The apparatus of claim 40, wherein the processor is configured to perform joint detection by performing linear combining or successive cancellation to reduce multi-code interference.

48. The apparatus of claim 40, wherein the processor is configured to form the joint detection matrix by deriving one or more channel matrices.

49. The apparatus of claim 40, wherein the processor is configured to form the joint detection matrix by deriving a linear combiner matrix at the one or more sub-carriers.

* * * * *

UNITED STATES PATENT AND TRADEMARK OFFICE
CERTIFICATE OF CORRECTION

PATENT NO. : 7,656,936 B2  Page 1 of 1
APPLICATION NO. : 10/352774
DATED : February 2, 2010
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2089 days.

Signed and Sealed this

Twenty-eighth Day of December, 2010

David J. Kappos
*Director of the United States Patent and Trademark Office*